US008959628B2

(12) United States Patent
Coppock

(10) Patent No.: US 8,959,628 B2
(45) Date of Patent: Feb. 17, 2015

(54) METHOD AND APPARATUS FOR PREVENTING UNWANTED CODE EXECUTION

(75) Inventor: William Coppock, Haywards Heath (GB)

(73) Assignee: CliqueCloud Limited, East Sussex (GB)

( * ) Notice: Subject to any disclaimer, the term of this patent is extended or adjusted under 35 U.S.C. 154(b) by 0 days.

(21) Appl. No.: 13/487,939

(22) Filed: Jun. 4, 2012

(65) Prior Publication Data

US 2013/0111584 A1 May 2, 2013

(30) Foreign Application Priority Data

Oct. 26, 2011 (GB) .................................. 1118490.0

(51) Int. Cl.
*G06F 21/00* (2013.01)
*H04L 29/06* (2006.01)
*H04L 29/08* (2006.01)

(52) U.S. Cl.
CPC ............. *H04L 63/145* (2013.01); *H04L 63/083* (2013.01); *H04L 67/02* (2013.01); *H04L 63/1483* (2013.01)
USPC .......................................................... 726/22

(58) Field of Classification Search
USPC ............................. 726/1–7, 21, 22, 26, 27, 30
See application file for complete search history.

(56) References Cited

U.S. PATENT DOCUMENTS

| | | | |
|---|---|---|---|
| 6,356,920 B1 * | 3/2002 | Vandersluis ................... 715/210 |
| 7,299,361 B1 * | 11/2007 | Kim et al. ...................... 713/188 |
| 7,636,945 B2 * | 12/2009 | Chandnani et al. ............. 726/24 |
| 7,647,404 B2 * | 1/2010 | Cooper et al. ................. 709/225 |
| 7,827,311 B2 * | 11/2010 | Cooley et al. ................. 709/245 |
| 7,836,500 B2 * | 11/2010 | Nason et al. ..................... 726/22 |
| 7,861,286 B2 * | 12/2010 | M'Raihi et al. ................... 726/5 |
| 8,006,096 B2 * | 8/2011 | Oda .............................. 713/183 |
| 8,046,495 B2 * | 10/2011 | Cooper et al. ................. 709/246 |
| 8,150,847 B2 * | 4/2012 | Ahmed et al. ................. 707/736 |
| 8,243,307 B2 * | 8/2012 | Tanaka ......................... 358/1.15 |
| 8,353,039 B2 * | 1/2013 | Cooley et al. ................... 726/24 |
| 8,490,117 B1 * | 7/2013 | Brichford ...................... 719/328 |
| 2002/0143774 A1 * | 10/2002 | Vandersluis .................... 707/10 |
| 2003/0097378 A1 * | 5/2003 | Pham et al. ................... 707/200 |

(Continued)

OTHER PUBLICATIONS

ECMA-262 Script Language Specification 5.1 Edition Jun. 2011.*

(Continued)

*Primary Examiner* — Michael R Vaughan
*Assistant Examiner* — Richard McCoy
(74) *Attorney, Agent, or Firm* — Lando & Anastasi, LLP

(57) ABSTRACT

There is provided a method of preventing unwanted code execution in a computing environment executing a scripting language and associated environment, wherein said computing environment comprises at least one server-side resource and a client side resource, comprising determining "safe" and "at risk" or "restricted" portions of the scripting language and associated environment, determining "trusted" and "untrusted" portions of the scripting language and associated environment, determining at least one "trusted" server-side resource, receiving from the "trusted" server-side resource an initial message containing one or more high-entropy secrets, and providing an unwanted code execution protection mechanism by reconfiguring said "at risk" or "restricted" portions of the scripting language and associated environment to require presentation of the one or more high-entropy secrets in order to execute.

20 Claims, 6 Drawing Sheets

(56) References Cited

U.S. PATENT DOCUMENTS

| | | | |
|---|---|---|---|
| 2004/0015580 A1* | 1/2004 | Lu et al. | 709/224 |
| 2005/0257269 A1* | 11/2005 | Chari et al. | 726/25 |
| 2006/0085761 A1* | 4/2006 | Allen et al. | 715/780 |
| 2007/0156592 A1* | 7/2007 | Henderson | 705/51 |
| 2007/0250930 A1* | 10/2007 | Aziz et al. | 726/24 |
| 2008/0263650 A1* | 10/2008 | Kerschbaum | 726/9 |
| 2009/0193126 A1* | 7/2009 | Agarwal et al. | 709/228 |
| 2009/0193498 A1* | 7/2009 | Agarwal et al. | 726/1 |
| 2010/0185751 A1* | 7/2010 | Sheedy et al. | 709/219 |
| 2010/0262584 A1* | 10/2010 | Turbin et al. | 707/674 |
| 2011/0099375 A1* | 4/2011 | Hammes et al. | 713/168 |
| 2011/0099633 A1* | 4/2011 | Aziz | 726/24 |
| 2011/0208801 A1* | 8/2011 | Thorkelsson et al. | 709/203 |
| 2012/0030294 A1* | 2/2012 | Piernot | 709/206 |
| 2012/0084570 A1* | 4/2012 | Kuzin et al. | 713/182 |
| 2012/0124007 A1* | 5/2012 | Sten et al. | 707/685 |
| 2012/0216133 A1* | 8/2012 | Barker et al. | 715/760 |
| 2012/0216280 A1* | 8/2012 | Zorn et al. | 726/23 |
| 2012/0278883 A1* | 11/2012 | Gayman | 726/19 |
| 2013/0074158 A1* | 3/2013 | Koskimies et al. | 726/4 |
| 2014/0237580 A1* | 8/2014 | Kato, Yutaka | 726/9 |

OTHER PUBLICATIONS

Java Script Override Patterns http://webreflection.blogspot.com/2010/02/javascript-override-patterns.html sampled May 15, 2010, dated Feb. 23, 2010; via Web Reflections web archive site.*

* cited by examiner

METHOD AND APPARATUS FOR PREVENTING UNWANTED CODE EXECUTION

RELATED APPLICATIONS

This application claims the right of priority under 35 U.S.C. §119 based on Great Britain patent application number GB 1118490.0 filed on Oct. 26, 2011 which application is incorporated by reference herein in its entirety as if fully set forth herein.

BACKGROUND

1. Field of the Invention

This invention relates to methods and apparatus for preventing unwanted code execution in a computing environment executing a scripting language and associated environment, and in particular, to methods and apparatus for preventing cross site scripting (XSS) attacks.

2. Related Art

Cross site scripting (XSS) is summed up by an attacker (also known as a hacker) "injecting" a script into a website (or any other viable vector, such as an instant messaging client, and the like) that causes a particular webpage or client software to send information outside of the intended host website, or that causes a website/client software to perform some other action that is desirable to the attacker, such as propagating spam messages, harvesting personal information for further attacks/fraud or simply proving a point.

There are three typical forms of XSS attack, summarised as follows: Reflected (or non-persistent) XSS, where by a website inadvertently allows mark-up or obfuscated mark-up submitted in a URL request string to be incorporated into the webpage. An attacker places a link in a second website or an email and coaxes a user into clicking the link, which contains the script. The requested webpage "reflects" the injected script resulting in the execution of the script and the possible disclosure of the details of the user who clicked on the link; Persistent. XSS, where by a website inadvertently allows mark-up to be saved to the server or where by a hacker is able to install mark-up or script on one or more pages through SQL-Injection or direct hacking of a server. The affected website subsequently incorporates the mark-up or script each time the affected webpages are loaded. The code contained in the mark-up executes for each user that accesses the affected pages; Self-XSS, where by a user is coaxed through careful social engineering to inject script directly into the browser address-bar or command prompt.

Cross site scripting attacks are particularly a thorn in the side for Web 2.0 sites, i.e. those websites that allow users to contribute content to the website and/or allow complex messaging between users (including recommendations, etc), for example social networking sites, and the like.

Social networking sites are particularly vulnerable because they have a very large user base, so even attacks expected to yield a low percentage of "hits" (i.e. a desirable, to the hacker, response from a target user) will still have a large number of victims. These social sites also have a very high self-information value, as they often contain a large amount of personal Information on a target user that is useful to the third party hacker when crafting a suitable attack.

Other reasons why social networking sites are particularly vulnerable include: the user base is highly susceptible to social engineering/social grooming attacks (i.e. leading users to do something unsafe, which they have been led to believe is completely safe); a social network's user base covers the most diverse range of technical understanding of how the internet works and the dangers that lurk beneath, so most users are quite unaware of the implication of what they are about to do and implicitly trust what their friends appear to have safe; social networks are designed to propagate information posted by their users rapidly to other users in the social graph through news posts, messages, etc. XSS attacks can hook onto this and affect a large number of users very rapidly; the ratio of users to support/monitoring staff of a social network is very high. It is easy for an attack to go unnoticed by the operator for a long time before they are able to start trying to stop the attack.

Accordingly, it would be desirable to provide a computer implemented security system to ameliorate the effect of the above problems.

SUMMARY

The present invention provides a method of preventing unwanted code execution in a computing environment executing a scripting language and associated environment, wherein said computing environment comprises one or more logically separated server-side resources and a client-side resource, wherein the client-side resource may receive scripts from the server-side resources or otherwise, and execute the said scripts within the scripting language and the associated environment, wherein the associated environment may be prebuilt or built by the actions of scripts or otherwise, wherein the method comprises determining "safe" and "at risk" or "restricted" portions of the scripting language and associated environment, determining "trusted" and "untrusted" portions of the scripting language and associated environment, determining at least one "trusted" and any number of "untrusted" server-side resources, receiving from the "trusted" server-side resource at least one message containing one or more high-entropy secrets, providing an unwanted code execution protection mechanism by reconfiguring said "at risk" or "restricted" portions of the scripting language and associated environment to require presentation of the one or more high-entropy secrets in order to execute, and leaving said "safe" portions of the scripting language and associated environment to execute freely.

In one embodiment, subsequent scripts sourced from the "trusted" and "untrusted" server-side resources and scripts executing in the "trusted" and "untrusted" portions of the scripting language and associated environment are presented with one or more of the high-entropy secrets that enable them to execute "at risk" or "restricted" portions of the scripting language and associated environment.

The message may be in any suitable form, for example a whole script file. The number of "untrusted" server-side resources may be zero.

In relation to the scripting language and its associated environment, the terms "safe" and "at risk" or "restricted" may be the reverse of the server source classification, so that, for example, scripts from the "trusted" server sources are allowed access to the protected portions of the environment (i.e. the protected portions are the "at risk" parts).

"Logically separated" may mean that the server resources can be on the same server, or even in the same service so long as there is logic to separate them.

In one embodiment, the one or more high-entropy secrets are reproducible across a number of client-server requests by virtue of a client-server session-identifier or a persistent client-server connection.

In one embodiment, the one or more high-entropy secrets are produced by the server-side resource as a secure hash of the client-server session-identifier and a high-entropy secret stored server-side and unique to the client-server session-identifier.

In one embodiment, the one or more high-entropy secrets are different for each page load by using an additional page identifying parameter submitted to the server-side resource in combination with the client-server session identifier and the high-entropy secret.

In one embodiment, reconfiguring of the "at risk" portion of the scripting language and associated environment comprises reconfiguring certain "at risk" objects, functions and property "accessors" to require the passing of the one or more high-entropy secrets as a parameter in order for execution to occur.

In one embodiment, reconfiguring of the "at risk" portion of the scripting language and associated environment comprises removing certain objects, functions and properties and replacing each with a new identity and to require the passing of the one or more high-entropy secret as a parameter in order for execution to occur.

In one embodiment, each new identity is determined by one of the high-entropy secrets.

In one embodiment, reconfiguring the "at risk" portion of the scripting language and associated environment further comprises marking certain portions of the associated environment with one or more high-entropy secrets as "scope identifier" and replacing certain objects, functions and properties with equivalent functionality that limits access to the associated environment depending on the "scope identifier" and that requires the passing of the one or more "scope identifiers" and the one or more high-entropy secrets as a parameter in order for execution and subsequent access to occur.

In one embodiment, reconfiguring the "protected" portion of the scripting language and associated environment further comprises replacing certain objects, functions and properties with equivalent functionality that automatically cascades the protection to newly created portions of the environment or newly created ancillary environments and that requires the passing of the one or more high-entropy secrets as a parameter in order for execution to occur.

In one embodiment, the scripting language and associated environment is self-mutable and the reconfiguring of said "at risk" portion of the scripting language and associated environment comprises using the scripting language to perform the reconfiguring and using its native functionality to render the changes immutable and the high-entropy secrets undiscoverable to scripts from the "untrusted" portion.

In one embodiment, the reconfiguration comprises a script sent as part of an initial message from the "trusted" server resource.

In one embodiment, the associated environment comprises a web browser and an HTML webpage served by a webserver in response to an HTTP or HTTPS GET or POST request; and the message containing the initial high-entropy secret from the "trusted" source is a response to separate HTTP requests made to the server-side resource arising from scripting language and associated environment elements embedded in the said HTML webpage or is delivered as part of the original HTTP response, for example as part of the HTTP headers. The scripting language may be any suitable scripting language or mix of more than one scripting langue, for example, the scripting language may be ECMAScript (JavaScript/Jscript) and/or VBScript.

In one embodiment, the one or more high-entropy secrets comprise one or more passwords. In one embodiment, the method comprises a method of preventing cross site scripting (XSS) attack. In one embodiment, the described methods may further comprise testing how effective the unwanted code execution protection mechanism has been or will be in applying the protection by attempting to circumvent the protection with known circumvention techniques. In one embodiment, the described methods may further comprise reporting activity blocked by the code execution protection mechanism, such as to the user directly (e.g. through on screen prompts or the like), or to other means, such as a log file, server environment or otherwise.

There is also provided a method of securing execution of a scripting language comprising delivering a web page with reference to an external script, that upon download and execution of the external script in a client browser environment is operable to make changes to the scripting language by replacing the native objects, functions and properties of the scripting language and document object model with new objects and functions that require a password parameter to work, wherein the external script is operable to irreversibly apply said changes in order to prevent circumvention by use of language modifying calls, wherein said external script is operable to maintain an anonymity of the password parameter delivered with the external script and any other subsequent scripts containing the same password parameter, by placing itself outside of the document object model and altering native functions that would otherwise allow access to information containing said password parameter.

In one embodiment, said external script is further operable to maintain the anonymity of other exploitable information, such as cookies, by altering further respective native functions to require use of the password parameter in order to execute. There is also provided a computing environment arranged to carry out any of the described methods, and a computer readable medium containing instructions, which when executed by at least one processor is operable to carry out any of the described methods. These and other aspects of the invention will be apparent from and elucidated with reference to the embodiments described hereinafter.

According to one aspect, a method of preventing unwanted code execution in a client/server computing environment is provided. The method includes executing a client-side scripting language and associated scripting environment, said associated scripting environment comprising functions, objects and properties, and their instances, wherein said computing environment comprises at least one server-side resource and a client side resource, wherein the client-side resource requests and receives from the server-side resource at least one message containing a script and executes the script in the associated scripting environment. In one embodiment the method also includes determining "safe" and "at risk" or "restricted" portions of the associated scripting environment, wherein a portion of the associated scripting environment comprises any instance of the functions, objects and properties of the scripting environment, determining at least one "trusted" server-side resource, determining "trusted" and "untrusted" script received by the client-side resource, wherein "trusted" refers to responses received from the "trusted" server-side resource, and "untrusted" refers to responses received from other external script sources, receiving from the "trusted" server-side resource at least one further message containing one or more passwords, and providing an unwanted code execution protection mechanism by re-writing said "at risk" or "restricted" portions of the associated scripting environment to require presentation of the one or more passwords in order to execute.

In another embodiment, the at least one further message comprises a whole script file. In another embodiment, the one or more passwords are reproducible across a number of client-server requests by virtue of a client-server session-identifier or a persistent client-server connection. In another embodiment, the one or more passwords are produced by the server-side resource as a secure hash of the client-server session-identifier and a session password stored server-side and unique to the client-server session-identifier. In another embodiment, re-writing of the "at risk" or "restricted" portions of the scripting environment comprises replacing certain objects, functions and property "accessors" to require the passing of the one or more passwords as a parameter in order for execution to occur. In another embodiment, re-writing of the "at risk" or "restricted" portions of the scripting environment further comprises renaming certain objects, functions and properties to provide each with a new identity. In another embodiment, each new identity is determined by one of the passwords.

In another embodiment re-writing the "at risk" or "restricted" portions of the scripting environment further comprises marking certain "restricted" objects within the associated environment with one or more passwords as "scope identifier" and replacing certain objects, functions and properties with equivalent functionality that limits access to the associated environment depending on the "scope identifier" and that requires the passing of the one or more "scope identifiers" and the one or more passwords as a parameter in order for execution and subsequent access to occur. In another embodiment, re-writing the "at risk" or "restricted" portions of the scripting language and associated environment further comprises replacing certain objects, functions and properties with equivalent functionality that cascades the protection to newly created portions of the environment or newly created ancillary environments. In another embodiment, the scripting language and associated environment is self-mutable and the re-writing of said "at risk" or "restricted" portions of the scripting language and associated environment comprises using its native functionality to render the changes immutable and the one or more passwords undiscoverable to scripts from the "untrusted" portion.

In another embodiment, the "untrusted" portion includes an HTML webpage served by a webserver in response to an HTTP or HTTPS GET or POST request; and the "trusted" portion includes a response to separate HTTP requests made to the server-side resource arising from scripting language and associated environment elements embedded in the said HTML webpage. In another embodiment, the one or more passwords are different for each HTML page load by using an additional page identifying parameter submitted to the server-side resource in combination with the client-server session identifier and the session password. In another embodiment, the scripting language is ECMAScript (JavaScript/Jscript) or VBScript. In another embodiment, the method further comprises a method of preventing cross site scripting (XSS) attack. In another embodiment, the method further comprises testing how effective the unwanted code execution protection mechanism has been or will be in applying the protection by attempting to circumvent the protection with known circumvention techniques. In another embodiment, the method further comprising reporting activity blocked by the code execution protection mechanism.

According to another aspect, a client/server computing environment is provided, operable to execute a client-side scripting language and associated scripting environment, said associated scripting environment comprising functions, objects and properties, and their instances, wherein said computing environment comprises at least one server-side resource and a client-side resource, wherein the client-side resource and the at least one server-side resource are arranged to execute any one or more of the previous method steps. According to another aspect, a client computing environment is provided, operable to execute a client-side scripting language and associated scripting environment, said associated scripting environment comprising functions, objects and properties, and their instances, wherein said client computing environment is arranged to carry out the client-side portions of any one or more of the previous method steps. According to another aspect, a server computing environment is provided, operable to serve up a client-side scripting language and associated scripting environment, said associated scripting environment comprising functions, objects and properties, and their instances, wherein said server computing environment is arranged to carry out the server-side portions of any one or more of the previous method steps.

According to another aspect a computer readable medium containing is provided. The computer readable medium includes instructions which when executed by at least one processor is operable to carry out any one or more of the previous method steps.

According to another aspect, a method of preventing unwanted code execution is provided. The method comprises identifying, by the computer system, at risk portions of an associated scripting environment, wherein a portion of the associated scripting environment comprises any instance of the functions, objects and properties of the associated scripting environment, identifying, by the computer system, at least one trusted server-side resource, receiving trusted and untrusted scripts by the computer system, wherein trusted refers to responses received from the trusted server-side resource, and untrusted refers to responses received from other external script sources, receiving from the trusted server-side resource at least one further message containing one or more passwords, and preventing, by the computer system, unwanted code execution by re-writing said at risk portions of the associated scripting environment to require presentation of the one or more passwords in order to execute.

According to one embodiment, the at least one further message comprises a whole script file. According to one embodiment, the method further comprises an act of reproducing the one or more passwords across a number of client-server requests by virtue of a client-server session-identifier or a persistent client-server connection. According to one embodiment, the method further comprises an act of producing the one or more passwords by the server-side resource as a secure hash of the client-server session-identifier and a session password stored server-side and unique to the client-server session-identifier. According to one embodiment, re-writing of the at risk portions of the scripting environment includes an act of replacing certain objects, functions and property accessors to require the passing of the one or more passwords as a parameter in order for execution to occur.

According to one embodiment, re-writing of the at risk portions of the scripting environment includes an act of renaming certain objects, functions and properties to provide each with a new identity. According to one embodiment, the method further comprises an act of determining each new identity by one of the passwords. According to one embodiment, re-writing the at risk portions of the scripting environment includes an act of verifying certain at risk objects within the associated environment with one or more passwords as scope identifier and replacing certain objects, functions and properties with equivalent functionality that limits access to the associated environment depending on the scope identifier and that requires the passing of the one or more scope identifiers and the one or more passwords as a parameter in order for execution and subsequent access to occur.

According to one embodiment, re-writing the at risk portions of the scripting language and associated environment includes an act of replacing certain objects, functions and properties with equivalent functionality that cascades the protection to newly created portions of the environment or newly created ancillary environments. According to one embodiment, the scripting language and associated environment is self-mutable and the re-writing of said at risk portions of the scripting language and associated environment comprises using native functionality of the associated environment to render the changes immutable and the one or more passwords undiscoverable to scripts from the at risk portion. According to one embodiment, the at risk portion includes an HTML webpage served by a webserver; and the trusted portion includes a response to separate HTTP requests made to the server-side resource arising from scripting language and associated environment elements embedded in the said HTML webpage.

According to one embodiment, the one or more passwords are different for each HTML page load by using an additional page identifying parameter submitted to the server-side resource in combination with the client-server session identifier and the session password. According to one embodiment, the scripting language is at least one of ECMAScript (JavaScript/Jscript) and VBScript. According to one embodiment, the method further comprises an act of preventing a cross site scripting (XSS) attack. According to one embodiment, the method further comprises an act of testing effectiveness of the unwanted code execution protection mechanism, wherein the act of testing the effectiveness includes an act of attempting to circumvent the protection with known circumvention techniques. According to one embodiment, the method further comprises an act of reporting activity blocked by the code execution protection mechanism.

According to another aspect, a client/server environment for preventing unwanted code execution is provided. The environment comprises at least one processor operatively connected to a memory, the at least one processor when executing instructions stored in memory is configured to identify at risk portions of an associated scripting environment, wherein a portion of the associated scripting environment comprises any instance of the functions, objects and properties of the associated scripting environment, identify at least one trusted server-side resource, receive trusted and untrusted scripts, wherein trusted refers to responses received from the trusted server-side resource, and untrusted refers to responses received from other external script sources, receive from the trusted server-side resource at least one further message containing one or more passwords, and prevent unwanted code execution by re-writing said at risk portions of the associated scripting environment to require presentation of the one or more passwords in order to execute.

According to one embodiment, the at least one further message comprises a whole script file. According to one embodiment, the at least one processor when executing the instructions stored in the memory is further configured to produce the one or more passwords by the server-side resource as a secure hash of the client-server session-identifier and a session password stored server-side and unique to the client-server session-identifier.

According to another aspect, a non-transitory computer readable medium is provided. The computer readable medium contains instructions, which when executed by at least one processor is operable to carry out a method for preventing unwanted code execution. The method comprises identifying at risk portions of an associated scripting environment, wherein a portion of the associated scripting environment comprises any instance of the functions, objects and properties of the associated scripting environment, identifying at least one trusted server-side resource, receiving trusted and untrusted scripts, wherein trusted refers to responses received from the trusted server-side resource, and untrusted refers to responses received from other external script sources, receiving from the trusted server-side resource at least one further message containing one or more passwords, and preventing unwanted code execution by re-writing said at risk portions of the associated scripting environment to require presentation of the one or more passwords in order to execute.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
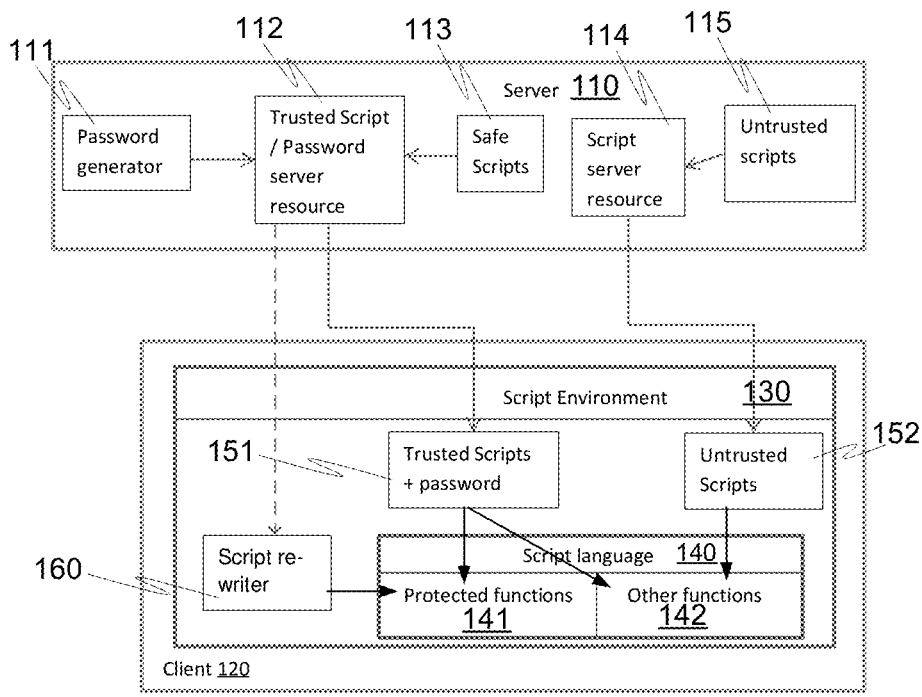
FIG. 1 shows a high level schematic diagram of an example embodiment of the present invention.

Because the illustrated embodiments of the present invention may for the most part be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The difficulty in dealing with XSS attacks is that the attacker can hide malicious code in a normal website message, where 'message' is according to the general information-theory concept, which in the case of the website could include a web page, a news post, an advert or, indeed, a message.

Since XSS attacks can mingle in with the real traffic they become perfectly dispersed and reach maximum entropy very quickly.

The weak link that is typically exploited for XSS attacks is in the web browsers used to render the web pages to an end user. The web browser will blindly do what the webpage source code tells it to do, so if there is a XSS worm (or other exploit executable code) somehow embedded in the webpage, then the webpage will execute that exploit code and may also propagate the code, and may also at the same time send some vital information about the user to the hacker's website.

Javascript (also known as ECMAScript or Jscript) is the scripting language of choice for XSS attacks, because it is supported by every modern browser. Other scripting languages that are vulnerable include ActionScript (a javascript variant used by Flash) and Visual Basic. Whilst the invention is described with particular reference to the Javascriptscripting language and web browsers, the invention is not so limited and may equally apply to other scripting languages in client-server environments.

XSS attacks that make use of Javascript are known to use the following mechanisms to get information out of the host website:Send information directly using objects such as ActiveXControl or XMLHTTPRequest; Modify an existing element by overriding a property, e.g. Element.src, Element.href, Element.action, so that when the element loads or is clicked, the information is sent; Make use of webpage modifying methods, such as createElement, appendChild, insertAfter to insert a new element that will cause information to be sent. This may be a script element, image, link, or any other element that can have an http source specified; Make use of a vulnerable embedded object to send the information, e.g. an activeX control or a media player; Interrogate the document object model (DOM) or website cookies in order to establish some session or user information that is necessary for the attack to succeed.

It is therefore beneficial for preventing the XSS worms from propagating to find a way of making the web browser distinguish between legitimate source code and something injected (and therefore illegitimate) by a hacker.

Embodiments of the present invention provide protection against XSS attacks for client side scripting languages, such as ECMAScript/JavaScript, by providing a mechanism that allows safe script code to execute unhindered, while not allowing malicious script code to execute or allow it to only execute in a restricted manner. Safe script is directed to a "favourable chamber", and malicious script to an "unfavourable chamber". A mechanism applying the embodiments of the present invention may be constructed using the methods described herein to have a relatively small 'code footprint' (so as to consume minimal network bandwidth, memory and processing time) and such that the deployment of the mechanism in an existing website maybe a straight forward task for a person skilled in the art.

A problem with malicious script is that it can be said to carry the same amount of self-information as a legitimate script, so marking processes that target malicious script cannot provide a lasting solution to the problem of XSS attacks.

A first step to a solution is to modify the problem a little and say that rather than filtering "safe" and "malicious" script, we will instead filter "trusted" and "untrusted" script into two chambers; a chamber granted access to "safe" functions only and another granted access to both "at risk" and "safe" functions. This may help because there can now be devised a marking process that targets the "trusted" script without having to worry that whether some untrusted, but otherwise "safe" script has ended up in the "untrusted" chamber. There are even situations when it might be intended to place some "safe" script in the "untrusted" chamber and be happy with the restrictions imposed there.

Claude E. Shannon derived a measure of information content called the self-information or "surprisal" of a message, the principle being that information is transferred from a source to a recipient only if the recipient of the information did not already have the information to begin with, i.e. a message that contains certain information has no element of surprise and therefore an information measure of zero. Peter Landsberg defines the order in an information system as:

$$\Omega = 1 - \frac{S_D}{S_{max}}$$

Where $\Omega$ is the order given $S_D$, the information-theoretic entropy relating to the disorder in the system and $S_{max}$, the maximum entropy of the system. From the perspective of a filter this implies maximum efficacy is achieved when the self-information relating to the filtered information ($S_D$) reaches zero.

The marking process according to embodiments of the present invention achieves this zero self-information condition by loading the "trusted" script with an immeasurable amount of self-information (i.e. surprise) relative to an "entrusted" script such that a malicious script therein cannot purposefully or accidentally mimic it, but at the same time making that information of absolutely no surprise to a filtering process carried out in embodiments of the present invention. An example method of doing this is to add a high-entropy secret (e.g. a sufficiently random and lengthy password) to the "trusted" script before it is sent, of which the "untrusted" script has no chance of becoming aware, but of which the filter is already aware. That is, the secret has been pre-shared with the receiver before any scripts are sent.

In this situation, the filter provided in client side embodiments of the present invention knows the secret that has been attached to the favourable messages, so $S_D$ is zero. It therefore does not matter what value $S_{max}$ takes, as the filter will always succeed. The exception is if a hacker, and by association the malicious script, has discovered the secret, which would then mean both the top and bottom of the equation are zero (so, $\Omega \rightarrow 0$).

Where the receiving system (i.e. the scripting environment) is receiving scripts from multiple sources, embodiments of the invention are at liberty to classify some sources as "trusted" and other sources as "untrusted", by operation of the filter, and then use the "trusted" source(s) to serve up scripts that are known for sure to be written and authorised by the respective website operators, and any other scripts are served from the "untrusted" source.

In scripting languages, individual scripts may be loaded and invoked at different times. Take for example HTML and JavaScript. Inline scripts download with the HTML and run as the HTML is rendered. The scripts in the head run first, then external script files referenced in the head are downloaded and run. Then finally any inline scripts in the body are run. There is also the possibility of generating script under program control. The consequence of this complexity is that a same source policy or a code execution policy may need to cross reference every object, function and property in the document object model (DOM) against which the scripting language created the relevant object, function or property, and further, check whether the current line of execution is passing through a script that has permission to execute in that context. This yields so many variables that it soon becomes impractical or even impossible to implement.

Thus, embodiments of the present invention uses the presence of a correct high entropy secret (e.g. password) to be the deciding factor in whether code executes or not and the secret is only allowed to be issued to or with scripts from the "trusted" source. This is even though the "trusted" and "untrusted" sources may be resources in the same physical server or the same domain.

FIG. 1 shows a high level schematic diagram of an embodiment of the present invention. There is shown a server environment comprising at least two server resources, which may or may not reside on the same physical server 110. One resource is dedicated to serving up "trusted" scripts 112 and the other resource to serving up "untrusted" scripts 114. The "untrusted" scripts 115 may be a mixture of "safe" and "malicious" scripts.

FIG. 1 shows in particular, the server 110 comprising a trusted script/password server resource 112, operably coupled to a password generator 111 (to provide it with passwords used in the described process) and a safe scripts storage means 113 operable to provide safe scripts to the trusted script/password server resource 112 on demand. Also located on the same server 110 is an untrusted script server resource 114 and a source of 'untrusted' scripts, e.g. an 'untrusted' scripts storage means 115.

The trusted script/password server resource 112, the untrusted script resource 114 and the client 120 provide the overall script environment 130, into which the particular scripting language used 140 may be reconfigured by a "script rewriter" 160 to provide protected functions 141 for trusted scripts having the correct password 151 and leave "other", unrestricted, functions 142 for the use of both trusted or untrusted scripts 152. The script environment typically includes browser provided native functions, which may be re-written by embodiments of the invention. Also, more than one language may be in use, for example Javascript and VBscript. In this case, if the environment is rewritten using Javascript, the changed functions can still be invoked using VBscript and vice versa.

The rewriter can be delivered as a script or be a persistent part of the client/scripting environment, e.g. in the form of an add-on/snap-in or compiled into the client.

Protection may be provided by embodiments of the present invention, as follows:

1. When the script environment is invoked, an initial request may be sent to the "trusted" server resource 112 for a password or a script containing the password. This initial request may be made as a result of an initial script executing within the environment, and may be performed before any other scripts are invoked.

2. The "trusted" server generates a password 111 which may be persistent for the duration of a session (i.e. a semi-permanent interactive information interchange, also known as a dialogue, a conversation or a meeting, between two or more communicating devices, or between a computer and user). If the session is defined by a persistent connection to the server 110 then the password may persist for the duration of the connection. If the session is defined by a session-identifier designed to bridge multiple connections or reconnections, then the password may persist until the session-identifier is destroyed, or otherwise inaccessible by the server 110.

3. Upon the script environment 130 receiving the password or the script containing the password 161, the scripting environment may be reconfigured ("rewritten") 162 such that execution of certain methods, including object constructors, functions, methods and property accessors (e.g. setters and getters) may be reconfigured to require the presentation of the password as a parameter. In the most global sense this reconfiguration may simply be to require the presentation of the password at the top of a script or before a series of instruction in order to permit the rest of the script or the instructions to execute. The precise nature of the password presentation and subsequent reconfiguration is dependent on the script language and the script environment involved.

4. Subsequent scripts delivered to the script environment 141 from the "trusted" server resource are accompanied by the same password, and so can execute unhindered. Whereas, subsequent scripts delivered to the script environment from the "untrusted" server resource 114 are not accompanied by the password, and so their entire execution or execution of restricted functions is prevented.

The following describes the general methods (called "script rewriter") for protecting a scripting language and associated environment. Some or all of the methods may be applicable to any given scripting language. No specification is made at this stage on the method of delivery, only of what needs to be achieved.

An initial task is to modify the language and its environment such that scripts downloaded and invoked from the "trusted" sources (and their source code and secrets) are rendered unreadable and undiscoverable to the scripts downloaded from the "untrusted" sources.

Functions

Figure 2:
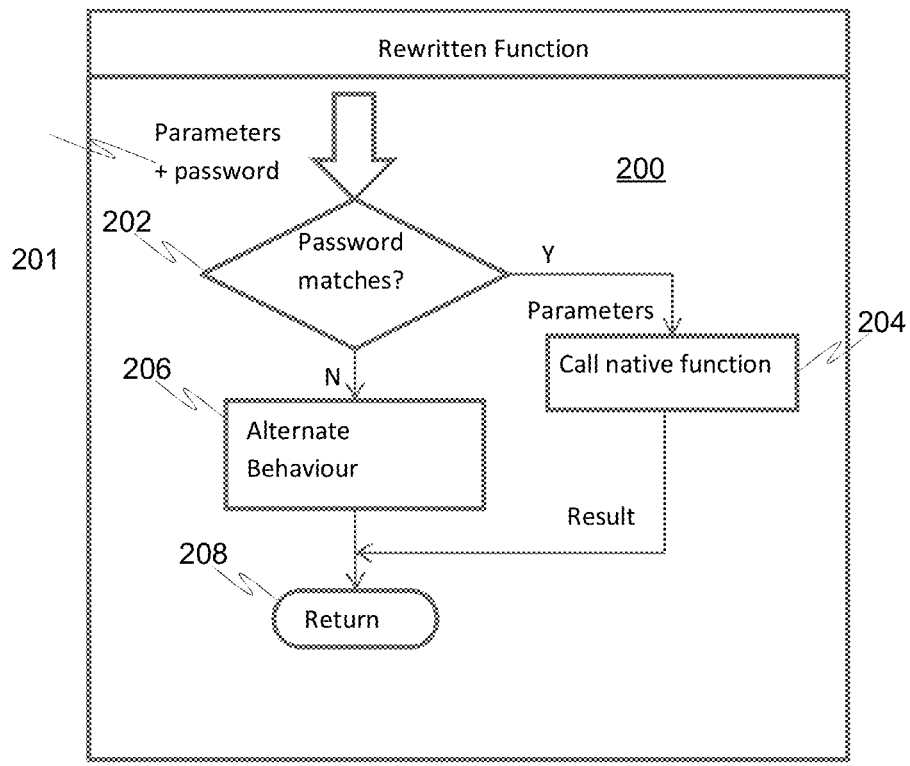
FIG. 2 shows how a function may be re-written according to example embodiments of the present invention.

FIG. 2 shows how a function may be re-written 200 according to embodiments of the present invention.

Functions and methods may be identified on the level of risk they pose to the scripting language environment and the user of the scripting, language environment. At risk functions and methods may be removed and replaced with a function of the same name or similar name that takes the same parameters, plus an additional password parameter 201. The password parameter may be compared 202 with the secret password provided by the trusted server resource and if a match is confirmed, the native functionality is invoked 204 and the function may return 208 to where it was invoked/called with the result of the native function. Where the password does not match, the function may invoke some alternate behaviour/functionality, which may include, but is not limited to: logging the activity, raising a language dependent exception or returning a neutral or undefined result 206, following which the function may return 208 to where it was invoked/called without the desired information.

Where a function accepts a variable number of parameters, then the recreated function may be provided with a different name, so that if there is any failure in the reconfiguration, then "trusted" scripts will no longer invoke the original function (thinking that it is the new password-accepting version) and passing the password as a parameter. This is because, the original function for instance writes text to a visual display then the password may otherwise be revealed (for example, reference: Javascript:document.write( )).

Object constructors may be protected in the same manner as functions.

As with functions, properties may be identified on the level of risk they pose. At risk properties may be hidden and replaced with two functions of similar name for setting (the setter) and getting (the getter) the property value, for example, a property ABC may yield functions setABC and getABC.

The setter function may take a new value and password as parameters. Internal to the function the password parameter may be compared with the secret password and if a match is confirmed then the new value may be applied to the property.

The getter function may take a password parameter. Internal to the function the password parameter may be compared with the secret password and if a match is confirmed then current value of the property be returned.

Where a scripting language defines classes or prototypes that are used to construct new objects, it may become necessary to apply the changes to functions, methods and properties as defined by a given class or prototype. In principle, instead of modifying individual objects, it may only be necessary to modify the class or the prototype, from which all existing objects in the scripting environment acquire the new protected functions. Where rewritten functions, methods and properties are re-implemented by sub classes, then it may be necessary to repeat the protection throughout the class hierarchy.

An important part of the modifications is to render them irreversible, i.e. deadlock them. Deadlocking is most important where the scripting language is self-mutable. That is, the scripting language's native objects, functions, methods and properties can be altered under program control.

This is not usually an issue with strongly typed object oriented languages, but it becomes a big issue in classless object oriented languages such as ECMAScript/Javascript. In a classless language there a number of ways that native functionality can be restored:

Deletion—Calling the languages destructor (delete) on a given object, function or property can result in the native version being restored. In JavaScript the behaviour of delete is very mixed in this respect. Some browsers act to restore the native functionality and others leave the object, function or property undefined, or a mixture of the two.

Reference Copies—A scripting environment can be composed of many interlocking environments, each one needing protecting in its own right. An example of this is IFRAMES in HTML pages. IFRAMES contain a completely new set of objects and prototypes that are independent of the parent webpage. It is possible to use one of these objects to obtain a reference copy of the native function, and then reassign that to the protected version, thus restoring the functionality.

Original versions—Another source of a reference copy is the copy of the native function that the protection mechanism itself must maintain. If the protection mechanism was delivered as part of a script, rather than being an integral part of the scripting language then the copy of the native function will have to be stored in a variable, which may require some global scope in order to be accessible by the new function. The following Javascript code sample illustrates the point:

```
saveAXO = ActiveXObject;
ActiveXObject = function(control,password)
{
   if (password != "1234")
      return
   else
      return new saveAXO( );
}
``` saveAXO is a global variable and therefore accessible from anywhere in the scripting environment. Malicious code can therefore easily access and use this variable. By simply prefixing the saveAXO variable with "var" it becomes a locally scoped variable. A particular quirk of Javascript is that locally scoped variables behave more like private members of the parent object. Since the function assigned to ActiveXObject is created in the same scope (the same parent object) then it will continue to be able to access the variable so long as the parent object exists.

Virtual deadlock is achieved when all reference versions of an object, function or property are overridden and where the language(s) destructor does not act to restore the native version.

Languages with property descriptors can provide positive deadlock, i.e. where some scripting languages provide interfaces that allow the overriding of property accessors (setters and getters) under program control including the prevention of further modification by marking the accessors as non-modifiable. Where this is the case it is possible to mark overridden objects, functions and properties as non-modifiable. If the scripting language has properly implemented property descriptors then neither the deletion of overrides nor the reassignment from reference copies will restore functionality.

Where the scripting environment is capable of creating new "nested" environments, those environments may also need protecting. Therefore it is advantageous to provide cascading protection.

In such a "nested" environment, the constructors of these new environments may need to cascade (or repeat) the protection in that environment. In the JavaScript scripting language, such functions include createElement, appendChild, insertBefore, and others. These functions may examine any element or elements being created or added to the parent node for the presence of elements that define a new autonomous DOM tree. An example is the IFRAME element, which as part of its environment defines a new window, document and DOM. Such an element can be used to obtain a reference copy of a protected function.

The presence of a cascading mechanism makes the overall protection system described herein autonomous and simple for a web master to implement on their website. Components are created and manipulated using the usual native functions (just with an additional password place holder) and protection is transmitted to child environments as they are added to the parent DOM without any need for further consideration by the web master.

Figure 3:
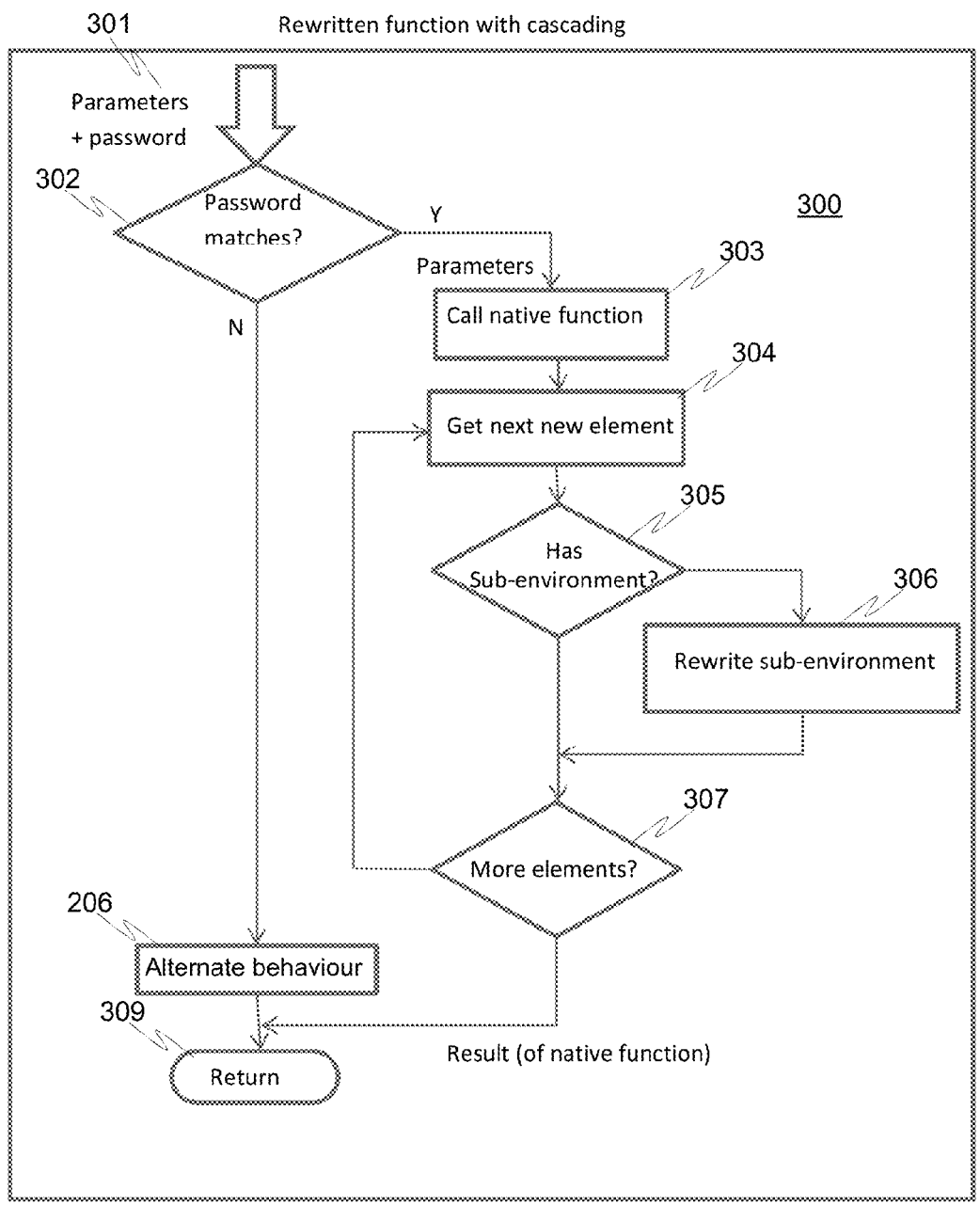
FIG. 3 shows how a cascading function may be re-written according to example embodiments of the present invention

FIG. 3 shows how a cascading function may be re-written 300 according to example embodiments of the present invention.

At risk cascading functions and methods may be removed and replaced with a function of the same name or similar name that takes the same parameters, plus an additional password parameter 301. The password parameter may be compared 302 with the secret password provided by the trusted server resource and if a match is confirmed, the native functionality is invoked 303. The sub-elements, created, amended or appended by the native functionality may then be scanned: the first element is retrieved 304 and tested to see whether it has a sub-environment or is a class of element that has a sub environment 305; if the presence of a sub-environment is confirmed then the "rewriter" is invoked for the sub-environment; scanning continues over subsequent sub-elements until no further sub-elements are found 307. After scanning the sub-elements, the function may return 309 to where it was invoked/called with the result of the native function. Where the password does not match, the function may invoke some alternate behaviour/functionality 206, which may include, but is not limited to; logging the activity, raising a language dependent exception or returning a neutral or undefined result 206, following which the function may return 208 to where it was invoked/called. Delivery of the script rewriter mechanism may be achieved in three ways, depending on the particular target scripting language capabilities:

1. As a precompiled component of the client environment. For instance, an integral part of a web browser.

2. As an add-on or snap-in to the client environment.

3. As a script, whereby the scripting language is self-mutable and possesses sufficient syntax to achieve deadlock of the changes.

The server resource used may be required to do the following:

1. Generate a password or passwords that are consistent for a given connection or session-identifier.
2. Deliver script files with the password embedded.

Password generation may be carried out in any suitable way. For example, a basic form of password is the session-identifier itself. Arguably as this mechanism is intended to prevent the disclosure of sensitive information, including the session-identifier, using the session-identifier as a password bears no greater risk that using some other secret. Session-identifiers are usually reasonably long; 64 bits or 160 bits are common standards. However, it is very likely that the session-identifier will be a value served up by both the "trusted" and "untrusted" sources and therefore freely accessible to "untrusted" scripts. This will certainly be the case in an HTML web page, where the session-identifier will probably be in any form "actions" and possibly href and src attributes. Only in the case where the session-identifier is stored as a cookie and where the protection mechanism has rendered cookies inaccessible will such access be improbable.

For this reason the password may be a session secret, i.e. a value attached to the session that is only disclosed to the scripting environment by the "trusted" source. A mere hash of the session-identifier is not sufficient, as that can be reverse engineered. The session secret may therefore be a completely random value in its own right that is maintained for the duration of a client-server connection or the duration of a session.

Delivery of Scripts

The "trusted" server resource may maintain a library of "trusted" script files. These "trusted" script files may be written such that place holders are put in the place where a password parameter is expected. The format of the place holder is not specified here, but the format may advantageously be unambiguous in the context of the scripting environment. For example, such a place holder devised for JavaScript may look like this:

var object=new ActiveXObject("some class","/*!param: hash*/");

Where /*!param:hash*/ is the place holder for the password optimised for use with a JavaScript minimiser.

Figure 4:
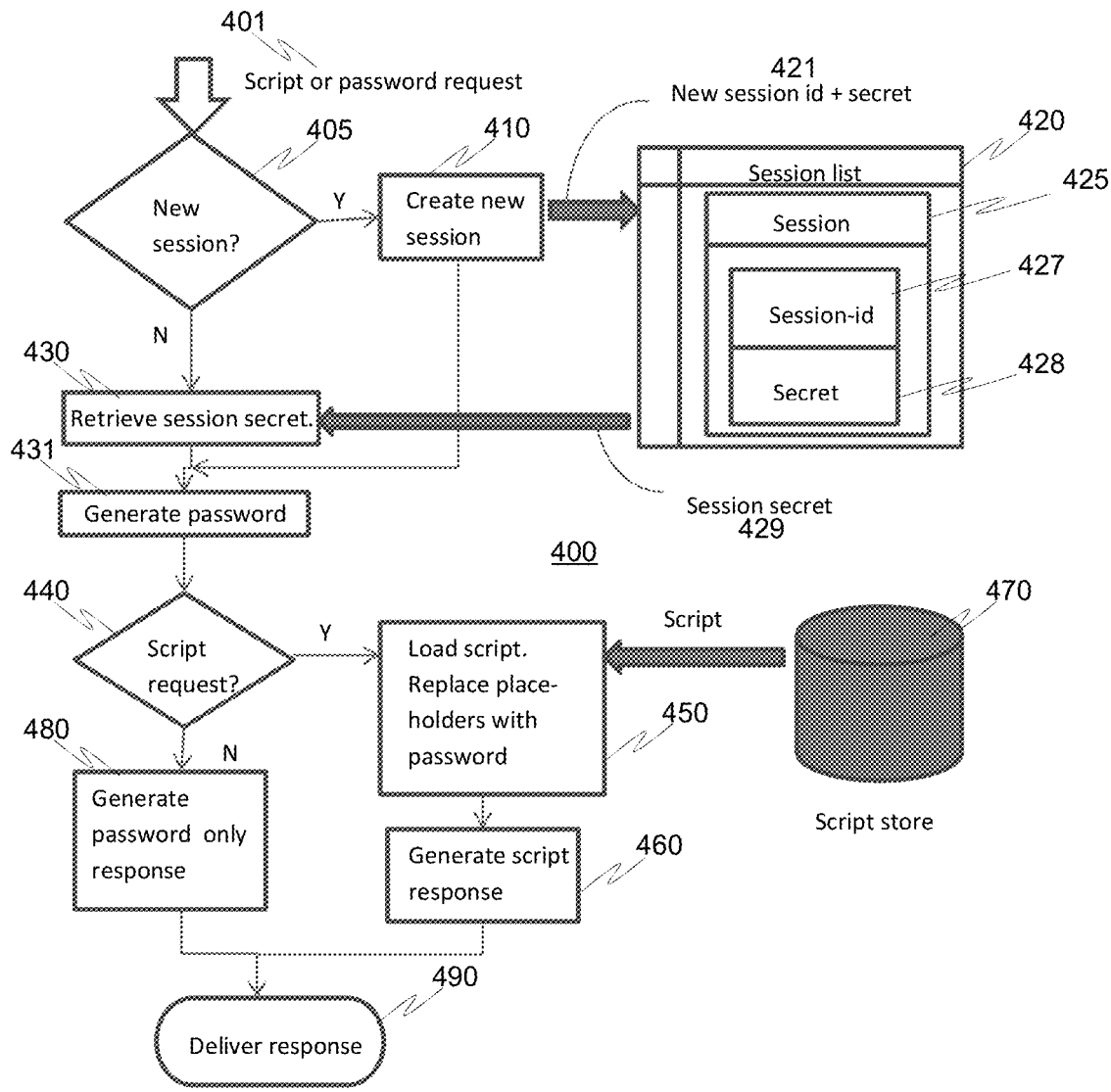
FIG. 4 shows a generalised server-side mechanism for managing session secrets and delivering script files according to example embodiments of the invention.

FIG. 4 shows a generalised server-side mechanism 400 for managing session secrets and delivering script files according to example embodiments of the invention.

FIG. 4 particularly shows a script or password request arriving at the server resource 401 from a client. The request may be checked for the presence of a valid session-identifier 405 by lookup in the session list 420, where no matching session object is found a new session object is generated 410 and stored 421 in a session list. Where a matching session object is found then it may retrieved from the list 430. The session object 425 may comprise of a randomly generated session-identifier 427 and a different randomly generated session secret 428. The session secret from the newly-created or retrieved session object may be used to generate a password 431. If the request is determined to be a script request 440, then the server resource may retrieve a corresponding script from the script store 470 and replace placeholders therein with the generated password 450. A suitable response containing the script (e.g. an HTTP response with appropriate MIME type headers and a text encoded script in the body) may then be generated 460 and delivered to the client 490. Otherwise, if the request is determined to be a password request, then a password only response (e.g. an HTTP response containing the password in a header field) may be generated 480 and delivered to the client 490.

Application of the described mechanism in ECMAScript in a HTML environment may depend upon two things:

1. The mutability or self-mutability of the scripting language. In the case of the Javascript language; this is its ability to be redefined under program control and with recent ECMAScript standards it is possible to redefine core functions and to deadlock such changes.
2. The fact that, in HTML, scripts can be sourced either from files external to the web page (using <script src="some url"/>) or as inline scripts (<script> elements within the HTML). The information carrying element of a website, with respect to self-information, is its web pages, or more precisely the HTML. External ".js" script files are (generally) static and therefore contain no self-information. Owing to this persistent and non-persistent XSS code is invariably served up as part of the webpage HTML. The External Script files are generally clean. (The exception to this may be when hacker has managed to break a web server's security and upload their own modified copy of a script file. This allows the innovation to do the following:

a. Identify "trusted" scripts as exclusively coming from external files.

b. Identify "untrusted" scripts as coming from inline <script> elements (that is the HTML itself) or other "untrusted" external script sources.

c. Provide a simple and reliable method of sandboxing the trusted scripts such that code running anywhere else in the scripting environment is unable to discover their source code and more specifically the secrets that they contain. This is explained below.

Figure 5:
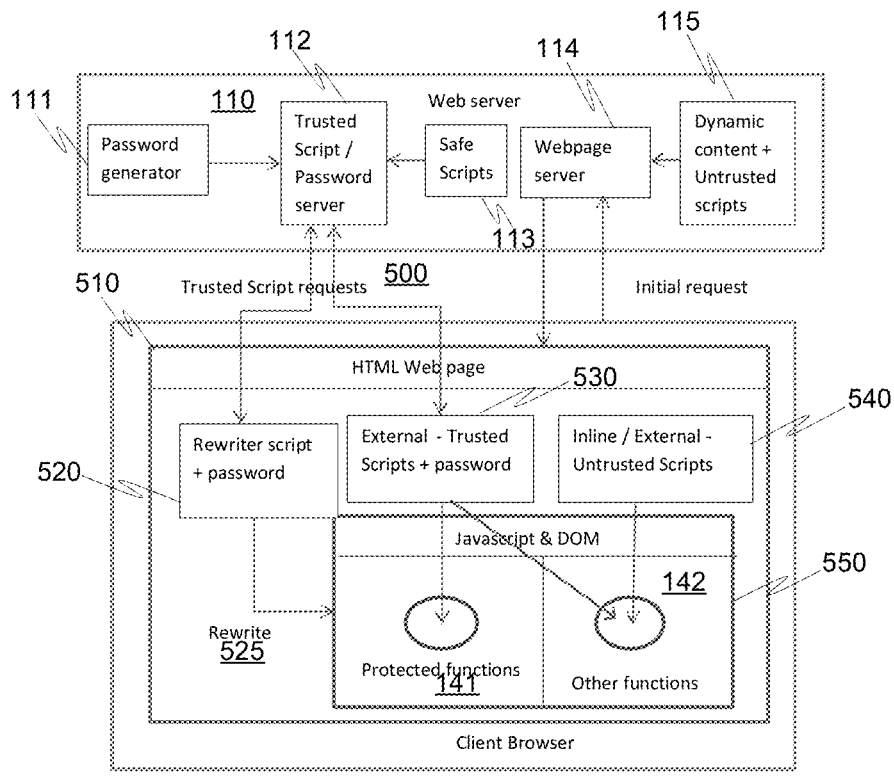
FIG. 5 shows an HTML and Javascript specific example embodiment of the invention.

A Javascript and webpage specific example embodiment of the invention will now be described with reference to FIG. 5. As per the general model of FIG. 1, the Javascript server environment consists of at least two server resources, which may or may not reside on the same physical server. At least one resource 112 is dedicated to serving up "trusted" scripts 113. The other source (or sources) is a webserver 114 which serves up a combination of HTML webpages and other "untrusted" scripts 115. Hereinafter, the script environment for the purposes of this implementation is the HTML webpage and its document object model (DOM) and will be referred to as the HTML environment.

HTML+Javascript Model

Protection is applied to a webpage as follows:

1. The client browser initially requests a web page from the webserver resource 114, The webserver resource 114 delivers an HTML document containing an external <script> reference to the "trusted" script source positioned in the document such that this script will be the first invoked (usually by placement in the document head). If this is the first connection the client has made to the server then a new session-identifier will be generated.

2. The HTML page is rendered 510, and the HTML environment has been "invoked". The external script reference causes an initial request 520 to be sent to the "trusted" server resource 112 for the rewriter. This request may include at least information relating to the session-identifier, which may be submitted as a cookie, a query string parameter or other distinct part of the URL request.

3. The "trusted" server resource 112 generates a response containing the rewriter script and a random password. The password may persist until the session-identifier is destroyed by the server 110. There may be provision within the server 110 resource to generate a new password for each distinct webpage by virtue of a random page identifier (produced by the webserver 114) that is submitted to the server resource as an additional parameter.

4. The HTML environment receives rewriter script containing the password. Upon receipt JavaScript and the DOM are rewritten 525 in accordance with the requirements of the generalised model. The rewriter can also be precompiled into the browser or installed as an add-on or snap-in. In this case, two further options arise:

a. The initial script delivered by the trusted source contains an invocation function+password. The invocation function calls the rewriter code already present in the client.

b. The initial script is replaced by an HTML header issued by the web server. Since the HTML header is inaccessible to persistent XSS at this point it can be considered trusted. A note must be made here though that the document header properties will need protecting to prevent "snooping" of this information.

5. Subsequent scripts 530 delivered to the script environment from the "trusted" server resource are accompanied by the same password. Primarily the password is used as a parameter to gain access to restricted objects, functions and properties of the ECMAScript language and DOM of the HMTL environment 550.

6. Subsequent scripts delivered to the script environment form the "untrusted" server resource are NOT accompanied by the password 540.

The following describes the detailed methods for protecting an ECMAScript based language and environment, using an EMCA Script "Script Rewriter".

Rewriter Scope (i)

The primary objective of this innovation is to prevent the transmission of information outside of the webpage. The following objects, functions and properties may require rewriting to achieve this objective. This is not an exhaustive list but intended to illustrate the scope of rewriting necessary to achieve the primary objective and remain true to the secondary objectives of producing a mechanism with a small 'code footprint' and one that is straight forward to deploy. A person implementing this innovation may wish to use the methods described herein to protect other aspects of the language or DOM in order to achieve other security objectives. It should also be noted that as various standards evolve other objects, methods and properties may need to be considered.

1. The following objects may directly send data outside of a web page: ActiveXObject, XMLHttpRequest, XDomainRequest 2. The following document functions may create new elements in a document, which may then transmit information outside of the webpage. For instance, by creating an IFRAME element or an IMG element: document.createElement, document.open, document.write, document.writeln, documentimplementation.createHTMLDocument.

document.openwarrants special attention, as calling this resets the whole DOM and consequently may remove all protection in one go. Document.write and document.writeln may also do the same if they are presented with an HTML tag. See the method below for reapplying protection.

document.implementation.createHTMLDocument may provide a source of reference functions in the new DOM it creates. See the section below on propagating protection.

3. The following DOM Element functions may modify a document, either by inserting new elements created by document.createElement, or by cloning, moving or modifying existing elements. Element.appendChild, Element.cloneNode, Element.insertBefore, Element.insertAjacentHTML, Element.insertAjacentElement, Element.document.removeChild, Element.document.replaceChild 4. The following are some examples of properties that maybe modified on existing elements to send data to other domains and whose 'setter' functions may require rewriting.<element>.src, <element>.href, <element>.action, <element>.innerHTML, <element>.outerHTML The application of this innovation to Javascript maintains its simplicity by exploiting a natural division between the source code of external script files and the document object model. The <script> elements that are used to reference the script files are part of the document object model. However the script objects only expose the URL of the script, not the source code. Therefore it is not possible to traverse the DOM and discover the source code of a whole script using innerHTML or Node functions.

There are two ways that source code can be discovered in Javascript.

1. Download the source using a call to XMLHttpRequest.

2. Discover the name of an enumerable function and call the toString( ) method, which will give the source code of the individual function.

Example embodiments of the invention may therefore start by removing unauthorised access to the XMLHttpRequest object, the method of which is described in more detail in the Objects section below. Then the toString function may be neutralised. In the simplest manner this can be achieved by setting the method on the Function.prototype to null:

Function.prototype.toString=null;

In most browsers this is an irreversible change. However, the change can be further secured by the method described in the Deadlock section.

Functions

Functions and Methods may be overridden at the prototype level using a wrapper function. Where a browser correctly implements the DOM these changes may be automatically inherited by the existing components, though this behaviour should not be relied upon. The following template shows (by example) the application of a typical wrapper function designed to cover browsers with fail safe application of the override to both the document object and the prototype:

```
var saveCreateElement = HTMLDocument.prototype.createElement;
var safeCreateElement = function(name,password)
{
if (password != "/*Password place holder*/")
    /* do something else */
else
return saveCreateElement.call(this,name);
}
try{
   document.createElement = safeCreateElement;
   HTMLDocument.prototype.createElement = safeCreateElement;
}catch(e){ };
```

Objects

Object constructors may be protected in the same manner as functions. It should be noted that some objects are not defined at the prototype level under current Java Script standards. The following is an exemplary method of achieving this:

```
var saveObject = OriginalObject;
OriginalObject = function(<parameters>,password)
{
if (password != "/*Password place holder*/")
    return /* or do something else */
else
    return new saveObject);
}
```

Properties

The override of properties may include the support of property descriptors and the overriding of native descriptors.

Since a property setter can only accept a single value parameter and getters can accept no parameters, then it may be useful to provide alternate functions and neutralise the original property descriptor. The following code example shows how this can be achieved. (referencePrototype is one of the prototypes in the DOM Class Tree.)

```
var descriptor = Object.getOwnPropertyDescriptor(referencePrototype,
"src");
    var saveSetSrc = descriptor.set;
    referencePrototype.setSrc = function(element,value,password){
        if(saveSetSrc){
            if (password != "/*Password place holder*/")
                /* Do something else */
            else
                saveSetSrc.call(element, value);
        }
        else if (element.src) element.src = value;
    }
    var setter = function( ){ };
    Object.defineProperty(referencePrototype, "src",
        {set:setter, get:descriptor.get,configurable: false});
```

DOM Class Tree

It should be noted that applying this protection is not a simple method of targeting one super class and that all sub-classes will follow suite. This may work on one browser, but not on all. A properly implemented DOM may override the native super class functions with new native functions for the subclass (usually to provide some sort of enforcement of the HTML/XHTML document type rules.) Therefore, in that case, it may be useful to repeat the element level protection (appendChild, insertBefore, src, href, etc) for each of the sub classes with a contingency for checking whether changes already applied to a super class have been inherited (and therefore should not be overridden again).

Deadlock

The deadlocking of changes may use the support of property descriptors and the overriding of native descriptors. In addition to the methods defined in the general section, the following are provided as exemplary methods of preventing the modification of changes by use of property descriptors.

Functions

Two methods exist for preventing the reversal of changes:

Method 1—Value Based Method:

```
referencePrototype.function = function( ){/*Replacement function*/};
    Object.defineProperty(referencePrototype, "function",
        {writable:false,configurable:true});
```

Method 2—Property Accessor Method:

```
var safeFunction = function( ){/*Replacement function*/};
    var dummySetter = function( ){ };
    Object.defineProperty(referencePrototype, "function",
        {set:dummySetter,get:function( ){return safeFunction;},
    configurable:false});
```

Method 2 may be preferably where web browsers do not properly observe the writable property and subsequent use of delete, while not restoring native functionality results in an "undefined" value.

Objects

The following method prevents the reversal of overridden objects.

```
var dummySetter = function( ){ };
    Object.defineProperty(referencePrototype, "objectProperty",
{set:dummySetter,get:function( ){return safeObject;},configurable:false});
```

Properties

The following method allows the neutralisation of original properties:

```
var descriptor = Object.getOwnPropertyDescriptor(referencePrototype,
"property");
    vardummySetter = function( ){ };
    Object.defineProperty(referencePrototype, "property",
        {set:setter, get:descriptor.get,configurable: false});
```

Cascading Protection and Repeating Protection

In JavaScript, protection is preferably cascaded when new objects are created that provide their own independent document object models, for example an IFRAME. Functions and properties that may result in such objects being created include, but may not be limited to: document.implementation.createHTMLDocument, Element.appendChild, Element.cloneNode, Element.insertBefore, HTMLElementinsertAjacentHTML, HTMLElement.insertAjacentElement, HTMLElement.innerHTML, HTMLElement.outerHTML, Element.document.removeChild and Element.document.replaceChild.

The following exemplary method shows how protection should be cascaded to affected objects in the case of appendChild.

```
var safeAppendChild = function(node,password){
if(saveAppendChild){
if (password != "/*Password place holder*/")
/* Do something else */
else{
var result = saveAppendChild.call(this, node);
if(result.tagName == "IFRAME")
rewriterFunction(result.contentWindow.document,result.contentWindow);
else{
var list = result.getElementsByTagName("IFRAME");
for(var i=0; i<list.length; i++){
rewriterFunction(list[i].contentWindow.document,
list[i].contentWindow);
}
}
return result;
}
}
}
```

Consideration may also be given to functions that erase protection because they may cause a complete rebuild of the DOM. Such functions include, but may not be limited to: document.open, document.write, document.writeln. When such functions are invoked it is preferable to repeat the rewriter function.

Self-Diagnostics and Compatibility

The mechanism may detect the compatibility of the browser being used by a client and the degree to which rewriting can be applied by test running a subset of the protection and then trying to reverse the changes (i.e. testing for deadlock support). The mechanism may then determine whether the browser is going to be 100% deadlock protected, protected but not deadlocked, or is incompatible. Where a browser is incompatible the rewriter may be operable to apply some basic "pass through" compatibility functions, for example "safeSetHref", "safeSetSrc", "safeGetHref", "safeGetSrc" so that scripts modified to use embodiments of the invention still run.

The described method may also include extension for allowing "trusted" inline scripts in HTML documents.

Figure 6:
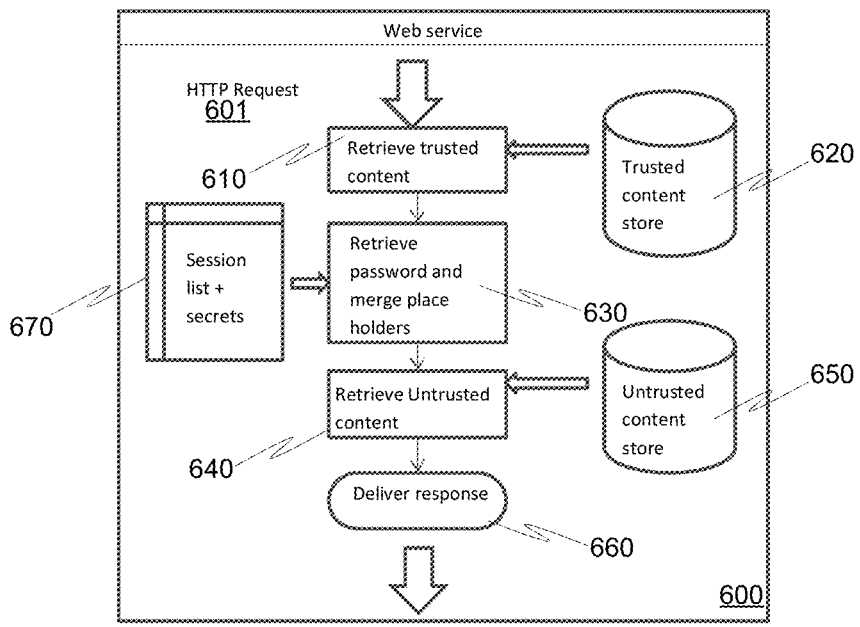
FIG. 6 shows how a technique for applying the innovation to ECMAScript and HTML can be extended such that both "trusted" and "untrusted" scripts can be incorporated in the HTML document as "inline" scripts, according to example embodiments of the invention.

FIG. 6 shows how a technique for applying the innovation to ECMAScript and HTML can be extended such that both "trusted" and "untrusted" scripts can be incorporated in the HTML document as "inline" scripts, according to example embodiments of the invention.

This allows the webmaster to prevent XSS from using proprietary objects, methods and properties that would otherwise have been exposed in the main HTML document without password protection.

This extension may comprise changes to both the web service and the script rewriter, for example.

The web service may be configured to retrieve "trusted" and "untrusted" scripts separately, as follows:

1. A new HTTP request arrives 601
2. Trusted content is retrieved 610 first from the trusted store 620. The trusted store 620 may be any sort of database or storage device with the single requirement that it is logically isolated from untrusted content.
3. The session secret is looked up from the session list 670 and a reproducible password generated. It is recommended that this password be different from the password used to prevent information from being transmitted outside the website as described thus far.
4. The password is merged in to the placeholders in the trusted content 630.
5. The "untrusted" content is retrieved 640 from the "untrusted" store 650.
6. The final HTML document is produced and the response delivered to the client 660.

The script rewriter may now have the task of sandboxing the content in the HTML document such that an "untrusted" script cannot discover the source code and/or secret of a "trusted" script.

As per the recommendation in step 3 above, the script rewriter may be primed with at least two different passwords. One password may be operable to provide the protection to objects, functions and properties that may be exploited to send data outside of the website and the other password(s) maybe operable to protect, and sandbox, the "trusted" inline scripts.

Rewriter Scope (ii)

An extended list of methods and properties that may need rewriting, includes, but is not limited to the following:

1. The following methods can be used to retrieve the content of scripts.

Node.nodeValue

2. The following properties

HTMLElement.innerHTML (getter)

HTMLElement.innerText

HTMLScriptElement.text

The above is not an exhaustive list but intended to illustrate the scope of rewriting necessary and may change according to the security needs of an implementation of embodiments of the present invention and future changes to the ECMAScript standard.

Extension

The previously described method may be extended such that "untrusted" scripts are permitted scoped access to the objects, methods and properties described in the "rewriter scope (ii)". For example access maybe granted to a particular branch of the DOM tree. This method may be beneficial where a web page is compiled of content derived from multiple sources and the scripts from each piece of content require access to elements therein.

The inline scripts (or content) may use two pieces of information in order to gain access to a function:

1. A globally unique identifier for the content (this is the scope);
2. A session-unique password for the content.

If these two pieces of information are known, then the "untrusted" script is permitted access to script elements or other elements that fall within its scope.

Whether a script or other element falls within the scope of an "untrusted" script may be determined by an additional attribute on the element containing the globally unique identifier. The presence of the additional attribute on a parent element in the DOM may grant permission to script, in possession of the correct password, access all child nodes beneath that element. This additional attribute is itself a risk vector and so is afforded protection by the script rewriter.

Web Service

Figure 7:
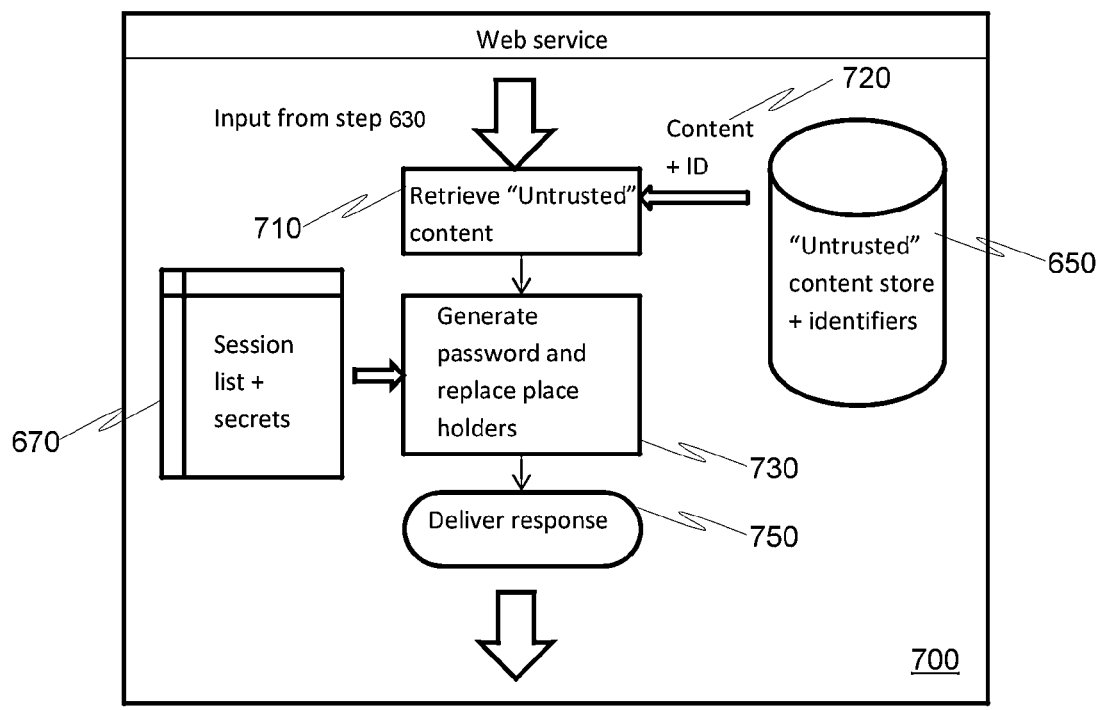
FIG. 7 shows an amended web service according to example embodiments of the present invention.

FIG. 7 shows an amended web service 700 according to example embodiments of the present invention.

The retrieval of untrusted content 640 (of FIG. 6) is amended as follows:

1. Each piece of "untrusted" content retrieved 710 from the "untrusted" content store 650 (as before) is assigned a unique identifier 720.
2. The session secret is retrieved from the session list 670. A reproducible password is generated 730, which this time may be a secure hash of the session secret and the "content identifier". The password and content identifier may be merged into placeholders in the content.
3. A respective resultant final response is provided 750.

The replacement functions for the risk vectors (identified above) may now need to accept two parameters (the password and the content identifier). Based on these values the replacement function may check whether the caller has the right to access a given HTML element based on the HTMLElement attributes containing the identifier.

Figure 8:
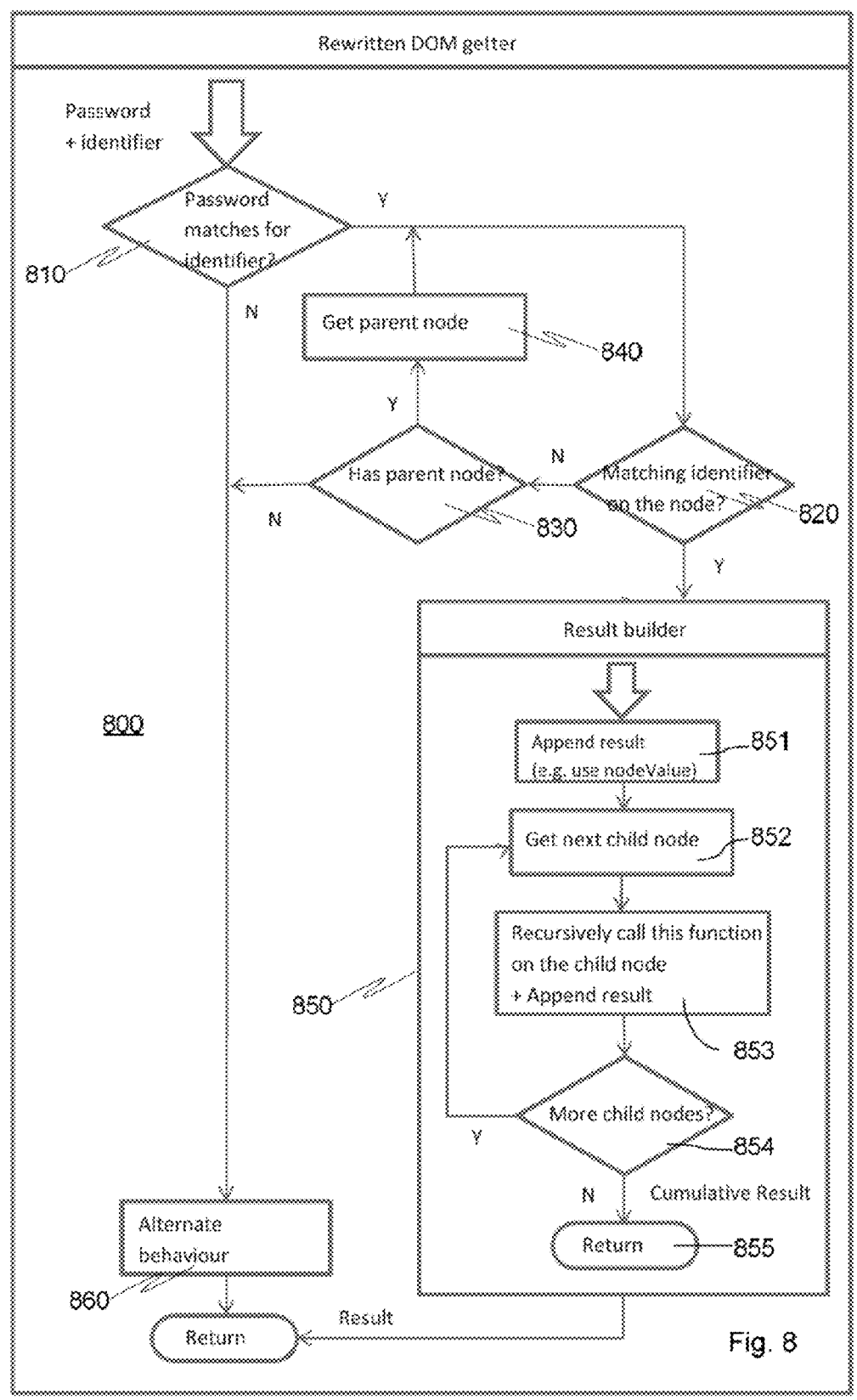
FIG. 8 shows native functionality may be replaced with a custom function that checks the permission to access each child element according to example embodiments of the invention.

Some of the risk vectors (such as innerHTML and innerText) compile a result by traversing child elements. This native functionality may need to be replaced with a custom function that checks the permission to access a given element and then traverse each child element building its result accordingly. This is illustrated in FIG. 8, comprising:

1. Scoped getter functions may be removed and replaced with a function of similar name that takes a password parameter and an identifier parameter. The password parameter may be compared 810 with the secret password provided by the trusted server resource for the given identifier. If a match is confirmed then processing continues.
2. The current node ("this") is examined for the presence of a matching identifier 820 and if a match is confirmed processing further continues. Otherwise the node is checked for the presence of a parent node 830 and if one is found that is retrieved 840 and that node tested for the presence of a matching identifier 820. The parent-checking process continues until no more parent nodes are found.
3. If a parent node was found with a matching identifier or the current node had a matching identifier then the result is built using a "result builder" function 850. The "result builder" may be the native function or may necessitate a replacement function as described:

a. The current node is passed to the function result builder function. The data for the current node is generated and appended to the result 851. This may entail calling node functions such as nodeValue.

b. Children nodes are then scanned: The first node may be retrieved 852 and the "result builder" called for this node 853 and the result appended. If further child nodes are found, then the process may be repeated 854.

c. When no further child nodes are available then the "result builder" function returns the cumulative result to the replacement getter function 855

4. Following the return of the result from the "result builder" or native function, the function may return to where it was invoked/called returning the result of the native function, 5. If the current node did not have matching identifier or none was found in the parent nodes or where the password and identifier did not match at the start, then the function may invoke some alternate behaviour/functionality, which may include, but is not limited to; logging the activity, raising a language dependent exception or returning a neutral or undefined result 860, following which the function may return to where it was invoked/called.

The invention may also be implemented as a computer program for running on a computer system, at least including executable code portions for performing steps of any method according to embodiments the invention when run on a programmable apparatus, such as a computer system or enabling a programmable apparatus to perform functions of a device or system according to embodiments the invention. The computer system may comprise a server-side resources and client-side resources.

A computer program may be formed of a list of executable instructions such as a particular application program, a pre-compiled component of an application (such as browser) or an add-on/snap-in for the application and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a suitable computer system.

The computer program may be stored internally on a computer readable storage medium or transmitted to the computer system via a computer readable transmission medium. All or some of the computer program may be tangibly recorded on computer readable media permanently, removably or remotely coupled to the programmable apparatus, such as an information processing system. The computer readable media may include, for example and without limitation, any one or more of the following: magnetic storage media including disk and tape storage media; optical storage media such as compact disk media (e.g., CD-ROM, CD-R, Blueray, etc.) digital video disk storage media (DVD, DVD-R, DVD-RW, etc) or high density optical media (e.g. Blueray, etc); non-volatile memory storage media including semiconductor-based memory units such as FLASH memory, EEPROM, EPROM, ROM; ferromagnetic digital memories; MRAM; volatile storage media including registers, buffers or caches, main memory, RAM, DRAM, DDR RAM etc.; and data transmission media including computer networks, point-to-point telecommunication equipment, and carrier wave transmission media, and the like. Embodiments of the invention are not limited to the form of computer readable media used.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary; and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as software or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise stated as incompatible, or the physics or otherwise of the embodiments prevent such a combination, the features of the following claims may be integrated together in any suitable and beneficial arrangement. This is to say that the combination of features is not limited by the specific claim form listed, particularly the form of the dependent claims.

The invention claimed is:

1. A method of preventing unwanted code execution in a client/server computing environment executing a client-side script by an internet browser, said internet browser comprising functions, objects and properties, and their instances, wherein the client/server computing environment comprises at least one server-side resource in network communications with the internet browser, wherein the internet browser receives the script from at least one script source and executes the script, wherein the at least one script source includes any one or combination of: messages received from the at least one server-side resource in response to requests made by the internet browser; the script entered by a user of the internet browser through a debug console; the script entered by a user through the internet browser address bar; the script contained in third party browser add-ons attached to the browser; and the script retrieved from a local storage device, the method comprising:

determining safe and at risk or restricted portions of the internet browser, wherein at least one of the portions of the internet browser comprises instances of the functions, objects and properties;

determining at least one of the at least one server-side resource to be a trusted resource;

determining trusted and untrusted portions of the script wherein trusted script includes script contained in messages received from the trusted resource using the network communications, and untrusted script refers to script received from untrusted script sources;

receiving, by the internet browser, from the trusted resource at least one message using the network communications containing one or more passwords; and in response to the receiving, preventing, by the internet browser, unwanted code execution by:

re-writing said at risk portions of the internet browser to require presentation of the one or more passwords to the internet browser in order for the internet browser or any script to execute said at risk portions, wherein re-writing is executed during runtime of the internet browser and includes altering the internet browser by a rewriter program executing in the internet browser, wherein the trusted resource includes the one or more passwords within each messages containing trusted script sent to the internet browser using the network communications subsequent to the at least one message, in order that the trusted script contained in the each messages is permitted to execute said at risk portions of the internet browser.

2. The method of claim 1, further comprising an act of reproducing the one or more passwords across a number of client-server requests by virtue of a client-server session-identifier comprising a random and globally unique data generated by the server and sent from the server to the client which said client subsequently includes in all messages to the server to identify the messages as originating from that client or a persistent client-server connection.

3. The method of claim 1, further comprising an act of producing the one or more passwords as a secure hash of a client-server session-identifier and a session password, wherein the session password comprises random data stored by the trusted resource, wherein the session password is associated with the client-server session-identifier.

4. The method of claim 1, wherein the re-writing of the at risk portions of the internet browser includes an act of replacing at risk object constructors, functions and property accessors integral to the internet browser to require passing one or more passwords as a parameter in order for execution of the other functions, object constructors or property accessors to occur.

5. The method of claim 4, wherein the re-writing of the at risk or restricted portions of the internet browser includes an act of renaming the at risk object constructors, functions and property accessors integral to the internet browser to provide each with a new identity.

6. The method of claim 1, wherein the re-writing of the at risk portions of the internet browser includes an act of identifying one or more objects integral to the internet browser as content and, marking the one or more objects within the content with one or more scope identifiers, wherein a scope identifier is globally unique data associated with the content the method further comprises at least one of a further act of receiving the one or more passwords from the trusted resource and associating the one or more passwords with the content or a further act of replacing at risk objects, functions, object constructors and property accessors integral to the internet browser to require passing the one or more passwords as a parameter in order to permit execution of the other functions, object constructors or property accessors and subsequent access by the other functions, object constructors or property accessors to the one or more objects marked with the one or more scope identifiers associated with the same content as the one or more passwords.

7. The method of claim 1, wherein the re-writing of the at risk or restricted portions of the internet browser includes an act of replacing at risk objects, functions and properties integral to the internet browser with equivalent functionality that repeats the act of re-writing the at risk or restricted portions on newly created portions of the internet browser.

8. The method of claim 1, wherein the script is of a scripting language that is self-mutable and the re-writing of said at risk or restricted portions of the internet browser environment comprises using native functionality of the internet browser scripting environment to render re-writing of the internet browser scripting language and the scripting environment immutable and the one or more passwords undiscoverable to scripts from the untrusted portion.

9. The method of claim 8, wherein the scripting language is at least one of ECMAScript (JavaScript/Jscript) and VBScript; the untrusted portion includes an HTML webpage served by a webserver in response to an HTTP or HTTPS GET or POST request; the trusted portion includes a response to separate HTTP requests made to the trusted resource from the scripting language embedded in the said HTML webpage.

10. The method of claim 9, further comprising an act of reproducing the one or more passwords across a number of client-server requests by virtue of a client-server session-identifier or a persistent client-server connection, wherein the client-server session-identifier comprises a random and globally unique data sent from the server to the client which said client subsequently includes in all HTTP requests to the server to identify the HTTP requests as originating from that client.

11. The method of claim 1, further comprising an act of testing the effectiveness of the re-written portions of the internet browser wherein the act of testing the effectiveness includes an act of attempting to access or execute the at risk portions of the internet browser or an act of reversing the re-written portions of the internet browser to their original state.

12. The method of claim 9, further comprising an act of reporting activity blocked by the re-written portions of the internet browser.

13. The method of claim 10, wherein an additional page identifying parameter is submitted to the trusted resource in combination with the client-server session-identifier so that the one or more passwords are different for each HTML page load.

14. The method of claim 13, further comprising an act of producing the one or more passwords by the trusted resource as a secure hash of the client-server session-identifier and a session password, wherein the session password comprises random data stored server side and associated with the client-server session-identifier.

15. The method of claim 9, wherein the re-writing of said at risk or restricted portions of the internet browser further comprises: using property descriptor functionality of the scripting language to define the re-written portions of the at risk or restricted portions of the internet browser irreversibly; and neutralizing functions of the scripting language capable of interrogating source code, including toString( ) and XMLHttpRequest( ) to prevent discovery of the passwords.

16. The method of claim 9, wherein the re-writing of the at risk or restricted portions of the internet browser comprises replacing at risk objects, functions and property accessors integral to the browser to require passing one or more passwords as a parameter in order for execution of the other functions, objects or property accessors to occur.

17. The method of claim 9, wherein the re-writing of the at risk or restricted portions of the internet browser includes an act of renaming at risk objects, functions and properties integral to the browser to provide each with a new identity.

18. The method of claim 9, wherein the re-writing of the at risk portions of the internet browser includes an act of identifying one or more objects integral to the internet browser as the content and, marking the one or more objects within the content with one or more scope identifiers, wherein a scope identifier is globally unique data associated with the content; the method further comprises at least one of a further act of receiving one or more passwords from the trusted resource and associating the one or more passwords with the content or a further act of replacing at risk objects, functions, object constructors and property accessors integral to the internet browser to require passing the one or more passwords as a parameter in order to permit execution of the other functions, object constructors or property accessors and subsequent access by the other functions, object constructors or property accessors to the one or more objects marked with scope identifiers associated with the same content as the one or more passwords.

19. The method of claim 9, wherein the re-writing of the at risk or restricted portions of the internet browser includes an act of replacing the at risk objects, functions and properties integral to the internet browser with equivalent functionality that repeats the act of re-writing at risk or restricted portions of the internet browser on newly created portions of the internet browser.

20. The method of claim 9, further comprising an act of testing the effectiveness of the re-written portions of the internet browser, wherein the act of testing the effectiveness includes an act of attempting to access or execute the at risk portions of the internet browser or an act of reversing the re-written portions of the internet browser to their original state.

* * * * *

UNITED STATES PATENT AND TRADEMARK OFFICE
CERTIFICATE OF CORRECTION

PATENT NO. : 8,959,628 B2  
APPLICATION NO. : 13/487939  
DATED : February 17, 2015  
INVENTOR(S) : William Coppock Page 1 of 1

It is certified that error appears in the above-identified patent and that said Letters Patent is hereby corrected as shown below:

In the Claims

Column 26, claim 1, line 2, delete "messages" and insert --message--;

Column 26, claim 1, line 6, delete "messages" and insert --message--;

Column 26, claim 8, line 60, delete "environment";

Column 26, claim 8, line 62, delete "scripting environment";

Column 26, claim 8, line 63, delete "scripting language and the scripting environment".

Signed and Sealed this  
Second Day of June, 2015

Michelle K. Lee  
*Director of the United States Patent and Trademark Office*